May 24, 1966 T. G. NORTH, JR 3,253,134
DIGIT BY DIGIT SERIES HIGH-LOW LIMIT COMPARATOR HAVING MEANS
FOR COMPLETING AN ELECTRICAL PATH THOUGH A LOGIC CIRCUIT
Filed March 15, 1961 5 Sheets-Sheet 1

Maximum Limit

Minimum Limit

INVENTOR
Thomas G. North, Jr.

BY R. P. Miller

ATTORNEY

United States Patent Office 3,253,134
Patented May 24, 1966

3,253,134
DIGIT BY DIGIT SERIES HIGH-LOW LIMIT COMPARATOR HAVING MEANS FOR COMPLETING AN ELECTRICAL PATH THROUGH A LOGIC CIRCUIT
Thomas G. North, Jr., Burlington, N.C., assignor to Western Electric Company, Incorporated, New York, N.Y., a corporation of New York
Filed Mar. 15, 1961, Ser. No. 96,041
2 Claims. (Cl. 235—177)

This invention relates to a testing device and more particularly to a comparison device for determining if a characteristic is within defined limits.

In the manufacture of many products it is necessary to weigh, measure, or perform other tests on the articles produced in order to determine if a variable characteristic of the article is within defined manufacturing limits. For instance, in the manufacture of electrical components such as resistors, vacuum tubes, transistors, etc., and assemblies such as servo-amplifiers, oscillators, etc., it is desirable to automatically test each component or assembly in order to determine if a variable characteristic, such as resistance, inductance, voltage, frequency, or any other feature which can be expressed as an electrical parameter, is within the required manufacturing specifications. Obviously manual testing of each component or assembly is not only slow and cumbersome, but expensive and inaccurate as well.

An object of the invention resides in new and improved testing devices.

Another object of this invention is to provide a comparison device for determining if a characteristic is within defined limits.

A further object is to provide a comparison for determining if a succession of variable characteristics is above or below a predetermined limit.

Still another object of this invention is to provide a logic circuit for determining when a test signal representative of a variable characteristic is within predetermined limits.

Apparatus embodying certain aspects of the invention may include a comparison panel into which a succession of test signals, each representative of a variable characteristic, are passed from a test panel. The signals are placed, one at a time, on a register within the comparison panel. Programmed signals representative of an upper and lower limit of each variable characteristic to be tested are placed on identical registers. These signals are then compared to determine if the test signal is within its predetermined limits, at which time a next test signal representative of a variable characteristic will be compared with identical or different limits as determined by the program. If a variable characteristic is found to be outside its limits, testing operations will be discontinued. In a similar manner the comparison device determines if a variable characteristic is above or below a predetermined value by comparing it with either an upper or lower limit.

A complete understanding of the invention will be had from the following detailed description of a specific embodiment thereof, when read in conjunction with the appended drawings, wherein.

Figure 1:
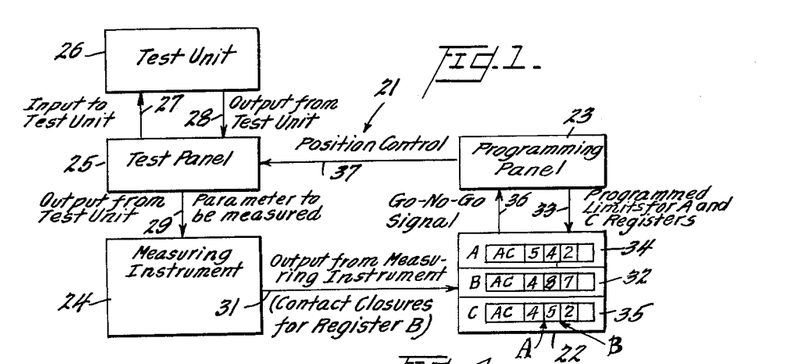
FIG. 1 is a block diagram of a comparison testing device embodying the principles of the present invention.

Referring now to FIG. 1, a general, overall description of the comparison device, designated generally by the numeral 21, will be given. The comparison device 21 comprises a comparison panel 22, a programming panel 23, a measuring instrument 24, and a test panel 25, all of which are electrically interconnected. A test unit 26 is electrically connected to the test panel 25 by one or more input leads 27 and one or more output leads 28. The test unit 26 may comprise a series of electrical components, such as resistors, capacitors, etc., or an assembly of components such as an amplifier, oscillator, etc., each having a variable characteristic which is to be measured and compared with defined limits of that characteristic.

The test unit 26 might also represent one or more transducers possibly located at remote positions and capable of converting virtually any measurable phenomena into a signal which can be measured by the measuring instrument 24 and compared in the comparison device 22. Thus by a suitable arrangement the test panel 25 might sample voltages or other parameters which have been converted from a variable characteristic such as temperature, humidity, speed, density of a mixture, radiation count, etc.

The test panel 25 provides input test signals for each test to be performed on the test unit 26 by means of the input leads 27 and receives test signals from the test unit 26 through the output leads 28. The test signals are then passed to the measuring instrument 24 through a conductor 29 where they are measured and converted into contact closures or an output signal which can be converted into contact closures.

The signal from the measuring instrument 24 in the form of digits or contact closures is passed to the comparison panel 22 through suitable leads 31 and placed on a B register 32 mounted in the comparison panel 22. Signals representing either a desired maximum or minimum limit or both are passed in the form of contact closures to the comparison panel 22 from the programming panel 23 through input leads 33 and placed on an A register 34 and a C register 35. Signals representing the maximum limit of the variable characteristic under test are placed on the A register 34 while the signals representing the minimum limit of the variable characteristic under test are placed on the C register 35.

The comparison panel 22 determines if the test signal placed on the B register 32 is within the limits placed on the A register 34 and the C register 35. If the test signal falls within the desired limits a Go signal will be passed to the programming panel 23 through an output lead 36. If the test signal is outside of its limits, a No-Go signal will be passed to the programming panel 23. Upon receiving a Go signal, the programming panel 23, which is connected to the test panel by a lead 37, advances the test panel 25 to a next test position on the test unit 26 and simultaneously passes a new set of limits for the next variable characteristic to be tested to the comparison panel 22. If a No-Go signal is received by the programming panel 23, the testing operations are stopped.

Referring to the B register 32 shown in FIG. 1, the particular variable characteristic under test is represented in a digital form as the numeral 487 while its maximum and minimum limits are represented on the A and C registers as the numerals 542 and 452, respectively. Obviously, the numeral in the B register 32 which represents the test signal, falls within the limits displayed on the A and C registers, and a Go signal would be passed to the programming panel 23 which would in turn cause a next comparison testing operation to be performed.

Figure 2:
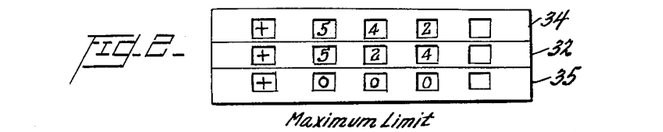
FIG. 2 is a block diagram of the face of a comparison panel in the testing device and illustrates a maximum limit comparison.
Figure 3:
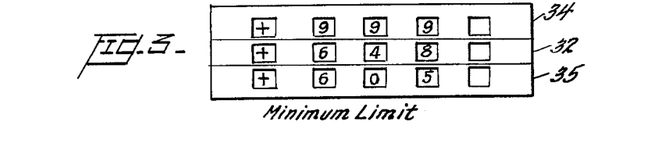
FIG. 3 is a view similar to FIG. 2 illustrating a minimum limit comparison.

Referring to FIGS. 2 and 3, the results of typical maximum and minimum limit comparison tests are shown. In the maximum limit test shown in FIG. 2, the comparison panel 22 will produce a Go signal for all test signal readings on the B register 32 below a +542, as shown on the A register 34, and No-Go signal for all test signals above that value. If a minimum limit comparison test is performed as shown in FIG. 3, the comparison panel 22 will produce a Go signal when the number displayed on the B register 32 is above the minimum limit of 605. A No-Go signal will result when the test signal reading on the B register 32 falls below 605. Of course, these limits may be varied as desired as well as the manner in which they may be expressed.

Figure 5:
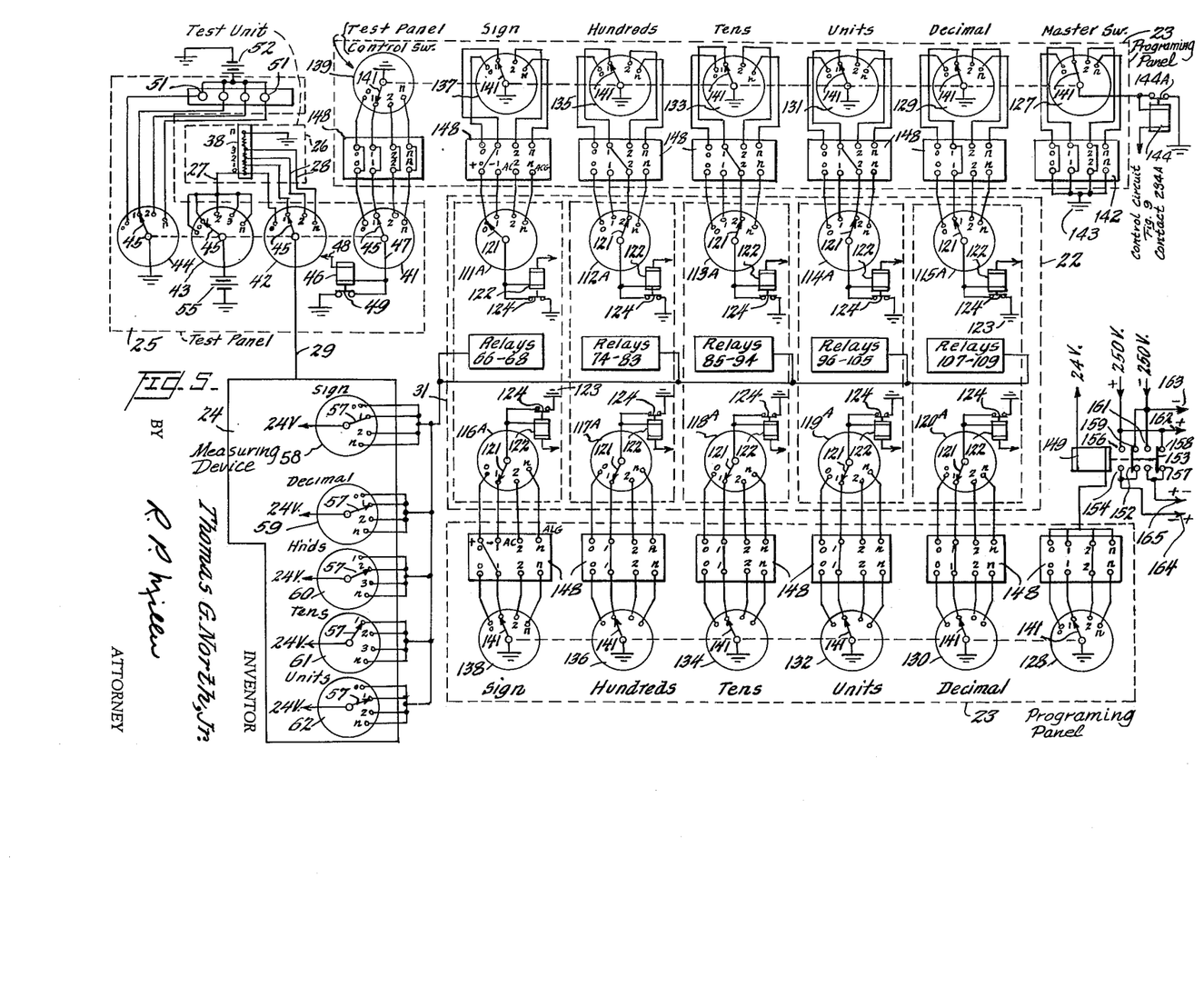
FIG. 5 is a circuit diagram of the comparison device.

Referring now to FIG. 5, a detailed description of the comparison device 22 will be given.

*Test unit*

As stated, the test unit 26 may be anything from a resistance which it is desired to measure and to determine if its value falls within predetermined limits to a complex combination of electrical components in which it is necessary to measure a large number of different types of parameters to determine if each parameter falls within, above, or below predetermined limits.

For instance, in the manufacture of voltage dividers it is extremely important that the voltage potential at each of a plurality of incremental voltage points be within predetermined limits for a given voltage drop along the length of the voltage divider.

For purposes of illustration only, the test unit 26 may comprises a voltage divider 38 having a plurality of incremental voltage positions ($o$–$n$) along its length. The voltage divider 38 is connected across ground and a suitable source of voltage supplied from the test panel 25 through the input lead 27.

*Test panel*

The test panel 25 comprises an indirect action-type stepping switch having four multiple position decks 41–44, each provided with a contact arm 45 movable over contacts ($o$–$n$) on each of the decks. The deck 41 may be termed a master deck in that a stepping switch coil 46 controls the stepping movement of the contact arm 45 associated therewith which in turn rotates the contact arms associated with the other decks 42–44. The master deck contact arm 45 is connected to the coil 46 by a lead 47 and is also connected to a normally closed contact 49 that is operated by the coil 46. Upon the energization of the coil 46 by a voltage source 48, the contact 49 is opened and the contact arm 45 cocked. The opening of the contact 49 opens the circuit from the source 48 through the coil 46, through the contact 49, to ground, thereby deenergizing the coil 46. The contact 49 then closes and the arm 45 advances one step from its former position. The stepping switch being of the ground-seeking type, the contact arm will be cocked and will advance in a step-by-step manner until it reaches a position having ground connected thereto.

The contacts ($o$–$n$) of the deck 41 are connected to the programming panel 23 which may supply ground thereto. The contacts ($o$–$n$) of the deck 43 are each connected to the voltage divider 38 under test. The contact arm 45 of the deck 43 is connected to one side of a battery 55 which is connected to ground. The output leads 28 are connected at one end to the incremental voltage positions ($o$–$n$) of the voltage divider 38 and at the other end to the contact positions ($o$–$n$) of the deck 42. The contact arm 45 of the deck 42 passes the test signals received from the voltage divider 38 to the measuring instrument 24 through the conductor 29. The contacts ($o$–$n$) of the deck 44 are connected to a bank of signal lamps 51. The signal lamps 51 are each connected to one side of a common battery 52 which is in turn connected to ground. The contact arm 45 of the deck 44 is connected to ground and thus completes a circuit through a signal lamp 51 for each of the contact positions ($o$–$n$). The signal lamps 51 indicate the particular incremental position of the voltage divider that is under test, and in case the automatic testing stops, the lamp that is lit indicates the particular increment that is faulty.

*Measuring instrument*

The measuring instrument 24 may be any device which makes measurements and provides an output signal in the form of contact closures or an output which can be converted to contact closures. Instruments commercially available include digital voltmeters, digital ohmeters, digital radiometers, frequency counters, etc. For purposes of describing an embodiment of this invention, a digital voltmeter capable of converting a test voltage into contact closures for five digits may be used. In this case one digit is designated as a symbol of the electrical parameter being measured, such as a D.C. or A.C. voltage. This digit may also be used to designate the polarity of a voltage as either a plus (+) or a minus (−) quantity. Three of the five digits making up the test signal are designated as either a hundreds, tens, or units digit, while the remaining digit represents a floating decimal point. Thus the measuring instrument 24 has a test voltage range of 0.01 to 99.9. Since the operation of this type of instrument is well known, no further description of the device need be given. For instance, the Digital Voltmeter, Model 3500, manufactured by Electro-Instruments, Inc., performs satisfactorily. It is not intended to limit this invention to the range of the measuring instrument, however.

In this instance, the measuring instrument 24 converts the test signals into contact closures which represent the value of the signal. This may be achieved as shown in FIG. 5, for instance, by controlling the position of contact arms 57 of stepping switches 58–62. The stepping switches 58–62 are designated sign, decimal, hundreds, tens, and units, respectively, and each has a plurailty of contacts ($o$–$n$). The contact arm 57 of each switch is connected to a suitable voltage source (not shown) so as to apply that voltage to the respective contacts ($o$–$n$). Thus the measuring device converts the test signal into a series of five separate voltages each of which may be selectively connected to one of a series of relays 66–109. The position of the arms 57 on the deck 58 determines which of the relays 66–68 will be operated, and in a similar manner the arm 57 on the deck 59 selects one of the relays 107–109, the deck 60 selects one of the relays 74–83, the deck 61 selects one of the relays 85–94 and the deck 62 selects one of the relays 96–105.

*Comparison panel*

The comparison panel 22 receives the test signal from the measuring instrument in the form of five voltages or digits. As stated, the five digits are arranged to express the variable characteristic as a numerical quantity and include a sign, hundreds, tens, units, and decimal digit. The test signal is placed on the B register 32. In a similar manner, signals representative of the maximum or minimum limit of the variable characteristic are placed on the A register 34 and the C register 35.

Figure 4:
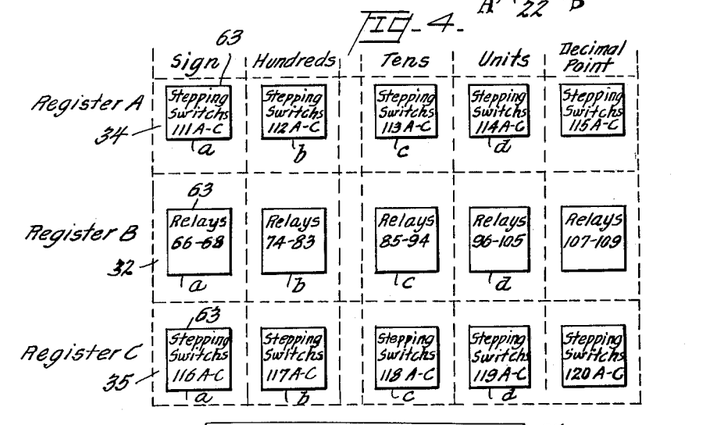
FIG. 4 is a detailed view of windows provided in the comparison panel wherein the windows are correlated with designated stepping switches and relays which present certain symbols in the respective windows.

The illustrated registers 32, 34, and 35 (FIG. 4) are commercially available Digital In-Line Readout Units, one of which is manufactured by Electro-Instruments, Inc., 3794 Rosecranz Drive, San Diego, California. Other types of registers may also be used such as vacuum tube registers which display symbols. Each of the registers 32, 34, and 35 has four windows (a–d), respectively, in each of which is mounted a series of Lucite plates 63. Each series of plates includes an individual plate for each symbol to be displayed and may include a plate representing a decimal point. The windows (a–d) of the registers 32, 34, and 35 are designated as the sign or symbol, hundreds, tens, or units digits windows, respectively. An additional window for the decimal digit is shown in FIG. 4 for purposes of clarity and as an aid in describing the operation of the device.

The plates of each of the series of Lucite plates 63 mounted in the windows (a) of the registers 32, 34, and 35 are engraved with the symbols +, −, AC, DC, etc., in accordance with the type of characteristics being measured. The plates of each of the series of Lucite plates 63 mounted in the windows b–d of the registers 32, 34, and 35 are engraved with the digits (0–9) and a decimal point. By suitable edge lighting one of the Lucite plates in each of the series of plates in the register windows a–d, the test signal and its maximum or minimum limits are displayed as numerical quantities including a sign or parameter symbol. The decimal point may be displayed in any of the windows b–d of the registers 32, 34, and 35 by lighting the respective decimal point plate in a similar manner.

The test signal displayed on the B register 32 is compared on a digit-by-digit basis with first the signal displayed in the A register 34 and secondly the C register 35 to determine if it is of a predetermined value as displayed by the A and C registers. The digit-by-digit comparisons are made in a sign comparison circuit, a numeral comparison circuit, and a decimal point comparison circuit, all of which are combined to form a logic circuit.

Figures 9, 10, 11:
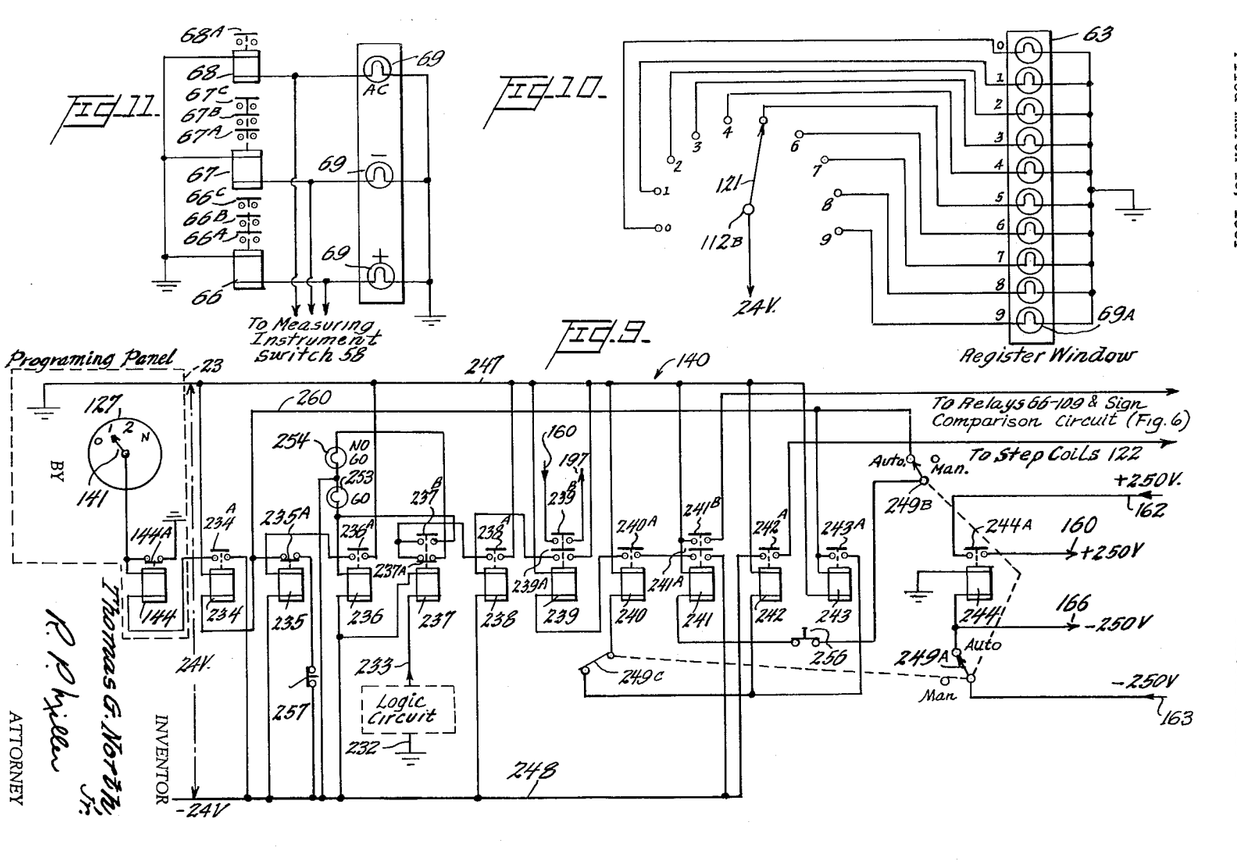
FIG. 9 is a diagrammatic view of a control circuit for the comparison device.
FIG. 10 is an electrical diagram of a register window display circuit.
FIG. 11 is an electrical diagram of a sign register display.

In the embodiment shown in FIGS. 5 and 11, the sign digit received by the B register 32 from the switch 58 is in the form of a voltage and actuates one of a series of relays 66–68 in the comparison panel 22 as well as lighting one of a plurality of lamps 69 connected to a common ground and in parallel with the relays 66–68. The relays are also connected to ground. The relays 66 and 67 control contacts 66A–C and 67A–C, respectively, while the relay 68 operates a contact 68A. All of the relays are suitably mounted in the comparison panel 22 and each controls a register lamp 69. The lamps 69 are mounted at the edge of each of the Lucite plates 63 (FIG. 4) in the register windows and correspond in number with the number of different symbols to be displayed in a particular window. In a similar fashion the hundreds digit signal voltage actuates one of a series of relays 74–83, the tens digit operates one of a series of relays 85–94, and the units digit actuates one of a series of relays 96–105, and the signal representing a decimal point actuates one of a series of relays 107–109.

The maximum and minimum limit signals for each test signal are placed on the A register 34 and the C register 35, respectively, and displayed as numerical quantities in a similar fashion. The sign, decimal, hundreds, tens, and units signals forming the maximum limit signal in the A register 34 each control one of a group of multiple deck, indirect action stepping switches 111–115. The sign, decimal, hundreds, and tens digits making up the minimum limit signal in the C register 35 each actuates one of a group of multiple deck, stepping switches 116–120 in the order recited.

Figure 6:
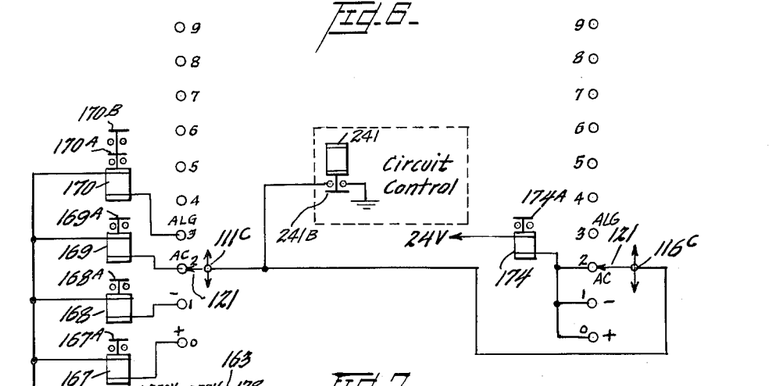
FIG. 6 is a diagrammatic view of a sign comparison circuit.
Figures 7, 8:
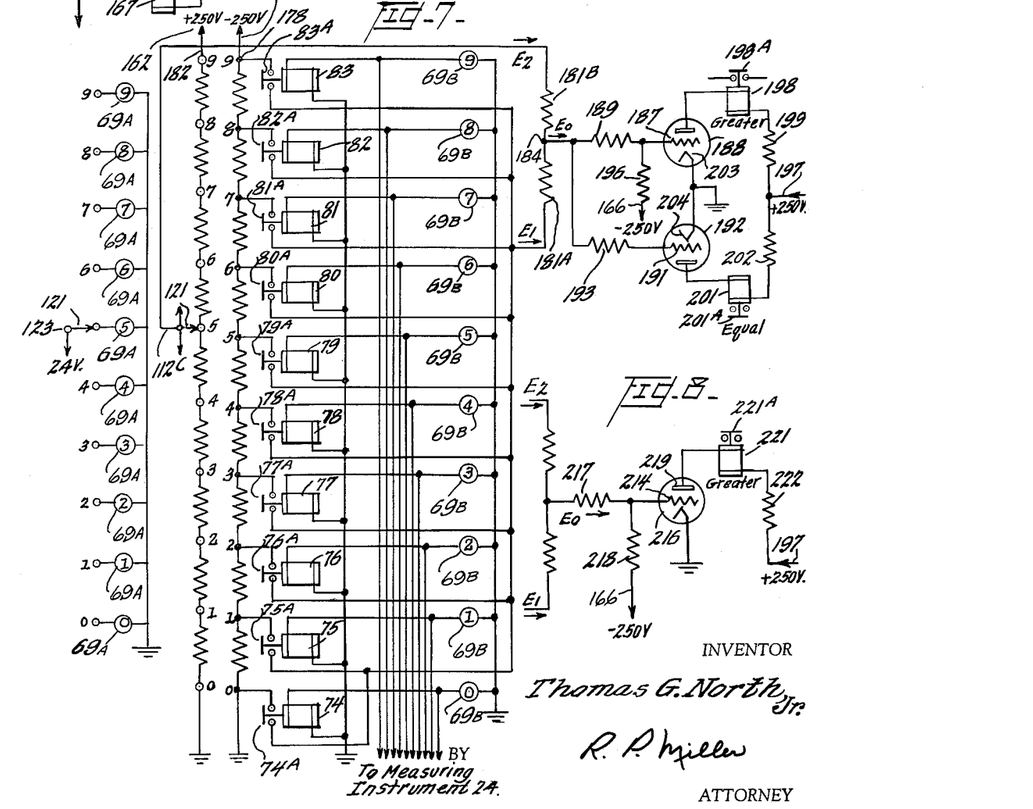
FIG. 7 is a diagrammatic view of a hundreds and a tens digit comparison circuit.
FIG. 8 is a diagrammatic view of a units digit comparison circuit.

The stepping switches 111–120 are suitably mounted on the comparison panel 22 and each has an A, B, and C deck, respectively. For simplicity only the A deck of each switch 111–120 is shown in FIG. 5. The B decks control parameter lamps and also number lamps. A typical B deck circuit is illustrated in FIG. 10, while the C decks are arranged as shown in FIGS. 6 and 7.

The A deck of each switch is the positive control deck. Each deck has a plurality of contacts (0–9), only four of which are shown in FIG. 5, and a contact arm 121 arranged so as to be stepped thereover. The contact arms 121 of the B and C decks of each of the switches 111–120 are stepped in unison with the contact arm 121 associated with the A (position control) deck of each switch. The contact arm 121 of each A deck is connected to a stepping switch magnet coil 122 which is normally energized from a suitable voltage (not shown). Each contact arm 121 associated with an A deck is also connected to ground through a normally closed interrupter contact 124 which is controlled by the coil 122. During the normal operation of a stepping switch, a circuit is completed through the coil 122, through the closed contact 124, to ground. The coil 122 thereby opens the contact 124 and also cocks the arm 121. Opening the contact deenergizes the coil 122. Upon deenergization of the coil 122, the contact arm 121 is released and steps to the next contact position. If the ground is connected to that contact position, a circuit will thereby be completed from the ground, through the contact arm 121, and through the coil 122, which reenergizes the coil 122. The coil cocks the arm and opens the contact 124. The contact arm 121 will remain stationary as long as the ground is connected to the arm 121. If there is no circuit completed to ground through the contact arm 121 upon reenergization of the coil 122, the normally closed interrupter contacts 124 will be opened to open the circuit through the coil 122 and thereby deenergize the coil 122 and release the arm 121. This action will occur until the arm 121 reaches the next contact position of the A deck connected to ground at which time the coil 122 will function to stop the arm.

Referring to FIG. 10, the contacts (0–9) of the stepping switch deck 112B is shown connected to a correspondingly numbered signal lamp 69A. Similarly, the contacts (0–9) of the decks 113B–115B and 117B–119B (not shown) are connected to correspondingly numbered signal lamps 69A. Also the contacts of the decks 111B and 116B (not shown) are connected to parameter lamps (+, −, AC, etc.). The contacts of the deck 116B are also connected to a decimal point lamp (not shown) as are the contacts of the deck 120B. The signal lamps 69A are arranged in a series of (0–9) lamps, one series provided for each of the respective switches 113B–115B and 117B–119B, each series being associated with one of the windows a–d of the A and C registers. The lamps 69A of each series are connected to ground while the contact arm 121 of each stepping switch deck 111B–120B is connected to a voltage source (not shown). As the contact arms 121 advance over the contacts (0–9) of the switch decks 111B–120B, the correspondingly numbered signal lamps 69 are turned on to display that respective number on the Lucite plates 63 in the windows a–d of the A and C registers.

*Programming panel*

The programming panel 23 is shown in two sections in FIG. 5 and comprises one or more ganged, indirect acting ground seeking stepping switches having a plurality of decks 127–139. Each deck has a plurality of contacts (o–n) and a contact arm 141 arranged to be stepped thereabout. The contact arms 141 of the switch decks 129–139 are each connected to ground. The number of contacts (o–n) may correspond to the maximum number of tests desired to be performed in succession, with the contact (o) being reserved as a starting position. The contact arms 141 of the stepping switch decks 128–139 are stepped in unison with and under the control of the contact arm 141 associated with the stepping switch deck 127, which is a master position control deck. Each of the contacts (o–n) of the master deck 127 is connected to one of a row of terminal punchings (*o–n*) on one side of a terminal strip 142. A like number of terminal punchings (*o–n*) in a second row on the terminal strip 142 are all connected to ground by strapping between the rows of terminal punchings on the terminal strip 142. Certain of the terminal punchings of the first row may be connected to the terminal punchings of the second row to connect ground to certain of the contacts (*o–n*) of the master deck 141.

The contact arm 141 of the master stepping switch deck 127 is connected to coil 144 which is normally energized by a suitable voltage source (not shown) that is controlled by a Go or No-Go signal from a control circuit 140 shown in FIG. 9. The contact arm 141 is also connected to ground through an interrupter contact 144A controlled by the coil 144. Because the control circuit 140 normally energizes the coil 144, the normally closed contact 144A will generally be open and the arm 141 will normally be cocked. When a Go signal is produced by the control circuit, the voltage source will be interrupted and the coil 144 will thereby be momentarily de-energized. Thus the arm 141 will be released and step one position on the deck 127, and the contact 144A will close. If the arm 141 is stepped to a position to which ground is connected by means of the strapping of the terminal strip 142, a circuit will be completed from ground through the strapping of the strip 142, through the arm 141, and through the coil 144 to the now connected voltage source of the control circuit 140. The contact arm will thereby be cocked by energization of the coil 144 but will not advance until another Go signal interrupts the voltage source. If the arm 141 had stepped to a position not connected to ground, the coil 144 would have stepped the arm until a ground-connected position was reached. In this manner the control circuit 140 initiates the stepping action of the arm 141 and the strapping of the terminal strip 142 controls the positions at which the arm will stop. The contact arms 141 of the stepping switch decks 128–139 are driven by and in unison with the arm 141 of the deck 127 over the contacts (*o–n*) of the respective decks.

The contacts (*o–n*) of each of the stepping switch decks 128–139 are connected to a correspondingly numbered terminal punching (*o–n*) in one row on one side of a terminal strip 148. Each terminal strip 148 is provided with a second row of terminal punchings (*o–n*), only four of which are shown in FIG. 5. The contacts (*o–n*) of each of the stepping switch decks 129–138 may be connected to the terminal punchings (*o–n*) of the second row of terminal punchings. Such a connection may be made by suitable strapping between the rows of terminal punchings.

Selective strapping between the positions (*o–n*) of each row of terminal punchings will connect certain contacts (*o–n*) of the decks 129–138 to certain contacts (*o–n*) of the A decks of the stepping switches 111–120. Advancement of the contact arms 141 to various positions (*o–n*) on the decks 129–138 will control the stepping action of the switches 111–120 by changing the contact (*o–n*) of the A decks to which ground is connected. The switches 111–120 are thereby actuated and will seek the newly programmed ground. When the switches locate the new ground, the B decks of the switches 111–120 will complete circuits to indicate in the A and C register windows the maximum and minimum test limits.

The contacts (*o–n*) of the deck 139 are strapped directly across punchings of terminal strip 148 and connected to correspondingly numbered contacts (*o–n*) of the switch deck 41 in the test panel 25, whereby the contact arms 45 will advance one step for each step of the contact arm 141, as discussed above.

The contacts (*o–n*) of the stepping switch 128 are likewise connected to correspondingly numbered terminal punchings (*o–n*) in a first row on the terminal strip 148.

A second row of terminal punchings (*o–n*) are strapped together and connected to a relay 149 which is connected to a voltage source (not shown). The contact arm 141 of the switch deck 128 is connected to ground. By appropriate strapping between the rows of terminal punchings on the terminal strip 148, the ground may be connected to the contacts (*o–n*) to energize the relay 149 for any given position of the contact arm 141 on the contacts (*o–n*). The relay 149 controls a pair of contact members 152 and 153.

In a normal position, the contact member 152 connects a contact 159 to a contact 154 and the contact member 153 connects a contact 157 to a contact 158. When the relay 149 is energized the contact member 152 connects the contact 154 to a contact 156 while the contact member 153 connects the contact 157 to a contact 161. The contacts 156 and 158 are connected to a positive 250 v. source (not shown). The positive source is connected to a lead 162 which is connected to the comparison panel 22. The contacts 159 and 161 are connected to a negative 250 v. source (not shown). A lead 163 is connected to this source and is also connected to the comparison panel 22. The contacts 152 and 153 are opened and closed in the relay 149 to alternately connect positive and negative voltage to the leads 164 and 165, respectively, which are also connected to the comparison panel 22. When the relay 149 is not energized, the voltage supplies 164 and 165 provide a negative and positive voltage, respectively. Upon energization of the relay 149, the polarity of the voltage from the supplies 164 and 165 is reversed. The purpose of this circuit is to provide suitable voltages to enable the comparison panel 22 to perform algebraic comparisons.

As shown in FIG. 5, the stepping switch decks 137 and 138 represent a sign, the decks 135 and 136 represent a hundreds digit, the decks 133 and 134 a ten digits, the decks 131 and 132 a units digit, and the decks 129 and 130 a decimal point. The contacts (*o–n*) of the decks 137, 135, 133, 131, and 129 are connected to the contacts (*o–n*) of the A deck of the stepping switches 111–115 of the register 34 through the terminal strips 148 associated therewith. The contacts (*o–n*) of the stepping switch decks 138, 136, 134, 132, and 130 are connected to the contact (*o–n*) of the A decks of the stepping switches 116–120 of the C register 35 through the terminal strips 148 associated therewith.

*Operation of programming panel*

Assume it is desired to display on the A register 34 a numeral representative of a maximum value of a voltage of +22.2 volts. The contact arms 141 of the stepping switch decks 127–139 are positioned on the (*o*) or starting contact of each switch. Before deenergizing the coil 144, the terminal strips 148 associated with the decks 139, 137, 135, 133, 131, and 129 are first strapped so that the contacts (*o–n*) of the respective switches are connected to the contacts (*o–n*) of the switch deck 41 and the switches 111–115, respectively, as follows. The contacts (*o–n*) of the switch deck 139 are connected directly across a terminal strip 148 to the corresponding contacts (*o–n*) of the master switch deck 41 of the test panel 25. As the stepping switch coil 144 is intermittently deenergized, the contact arm 141 steps around the switch deck 139 to connect in succession each of the contacts (*o–n*) to ground. When the contact arm 141 is stepped to remove ground from a first contact of the deck 139, contact (1) for example, and applies ground to a second contact, (2) for example, the stepping switch coil 46 will be deenergized causing the contact arms 45 of the switch decks 41–44 to advance one step to their corresponding respective contact (2). The contact arms 45 will stop at position (2) because the contact arm 141 has connected ground thereto on deck 41. Thus the test panel 25 is operated and the proper test signal voltage is passed to the measuring instrument 24 from the voltage divider 38 under test.

Each of the contacts (o–n) of the stepping switch deck 137, representing the sign digit for the A register 34, are connected across the terminal strip 148 to which are connected one of a number of terminal punchings designated +, –, AC, and Algebraic (ALG), etc., respectively. Each of these punchings is in turn connected to the contacts (o–n), respectively, of the stepping switch 111A. In this example the contact (1) of the stepping switch deck 137 is connected to the terminal punching of the terminal strip 148 designated +, which is in turn connected to the contact (o) of the stepping switch 111A to apply ground thereto.

Each of the contacts (o–n) of the stepping switch deck 135, representing the hundreds digit, is connected to one of the terminal punchings (o–n) of the terminal strip 148 associated therewith. The terminal punchings (o–n) of the terminal strip 148 are in turn connected to correspondingly numbered contacts (o–n) of the stepping switch 112A. In this manner the ground 141 may be connected to any one of the contacts (o–n) of the stepping switch deck 112A for any given position of the contact arm 141 of the stepping switch deck 135. This in turn controls the stopping position of the contact arm 121 of the ground-seeking stepping switch 112. In this instance the contact (1) of the switch deck 135 is connected to contact (1) in the first row which is connected to terminal punching (2) in the second row of the terminal strip 148, which is in turn connected to contact (2) of the stepping switch deck 112A.

In a similar fashion contacts (1) of the tens digit stepping switch deck 133 and of the units digit stepping switch deck 131 are connected to one of the contacts (o–n) of the stepping switch decks 113A and 114A, respectively. In this example, the contacts (1) of the stepping switch decks 133 and 131 are connected to the contacts (2) of the switch decks 113A and 114A, respectively, to connect ground thereto.

In order to provide a decimal point for any number which it is desired to display, the contacts (o–n) of the decimal point stepping switch deck 129 are connected to correspondingly numbered contacts (o–n) of the stepping switch deck 115A by appropriate strapping of the terminal punchings of a terminal strip 148. Inasmuch as the numeral to be expressed on the A register 34 in this example is +22.2, the contact (1) of the stepping switch 129 is connected to contact (1) of the switch deck 115A. If it were desired to express the number +2.22 on the A register 34, the contact (1) of the deck 129 would be strapped to the contact (2) of the terminal strip 148. The position of the decimal point in the number 2.22 will be hereinafter referred to as A and the position in the number 22.2 as B.

With the foregoing connections having been completed and upon momentary deenergization of the coil 144 by the control circuit 140, the contact arm 141 of the master switch deck 127 and the ganged contact arms 141 of the decks 139, 137, 135, 133, 131, and 129 will simultaneously step from contact (0) to contact (1). At this point the contact arms 45 of the test panel 25 are actuated by the deck 139 to advance and select from the test unit 26 a test signal which is to be displayed on the B register 32. The sign stepping switch deck 137 places ground on the contact (0) of the stepping switch deck 111A. The hundreds, tens, and units switch decks, decks 135, 133, and 131, respectively, each place ground on contacts (2) of the stepping switch decks 112A, 113A, and 114A, respectively. The decimal switch deck 129 places ground on contact (1) of the stepping switch deck 115A.

Thus, having removed ground from the contact arms 121, the coils 122 are deenergized and release the contact arms 121. The arms 121 will step until they reach the first contact having ground thereon; in this instance the contacts 0, 2, 2, 2, and 1 of the respective switch decks.

At the same time contact arms 121 step across the B decks of the stepping switches 111–115 until they find the corresponding contacts 0, 2, 2, 2, and 1, respectively. This in turn energizes the correspondingly numbered register lamps 69 in the windows (a–d) of the A register 34 to display the numeral +22.2 in the Lucite plates 63 mounted therein, as shown in FIG. 10.

In a similar manner any number having a sign and decimal point can be displayed on either the A or C registers by suitable strapping of the terminal strips 148 associated with the respective sign, hundreds, tens, and units digits and decimal point stepping switches.

As the numerals are being displayed on the A, B, and C registers, they are compared sign for sign, numeral for numeral, and decimal point for decimal point. As stated, these comparisons are made in a sign comparison circuit, numeral comparison circuit, a decimal point comparison circuit, and a sign, numeral, and decimal point comparison logic circuit. Upon determining that the test signal displayed in the B register 32 is within its limits or limit displayed on the A and C registers, a Go signal will be produced to actuate the programming device 23. If it is determined that the test signal falls outside of its limit or limits, a No-Go signal will be produced to stop the programming panel 23 and the comparison testing device 21.

*Sign comparison circuit*

In comparing numerals representative of different variable characteristics, it is important to know what parameters are being compared during any given test. Thus it becomes necessary to designate the parameter with an appropriate sign such as a +, –, AC, DC, *f*, etc., depending upon what is being measured. As will become apparent from the description of FIG. 11, the sign comparison circuit is necessary to prevent unlike parameters from achieving a satisfactory comparison, when the other requirements of numeral or decimal comparison are met. Thus by employing a sign comparison circuit, a Go signal would be prevented in the following comparison, even though the number displayed on the B register falls within limits defined on the A and B registers:

A register ______________________________ DC 8.00
B register ______________________________ AC 6.00
C register ______________________________ DC 4.00

For purposes of illustrating an embodiment of this invention, the use of only three signs (+, –, and AC) will be described, although any number of signs or parameters could be used. Provisions are also made for an algebraic comparison of numerals.

Referring to FIG. 11, the sign comparison circuit for selecting and displaying the above-referred to signs in the windows (a–d) of the B register is shown. The measuring device sign output is transmitted to one of the relays 66–68, depending upon which contact of the sign deck 58 is connected to the 24 v. supply. One of the relays 66–68 is thereby energized, thus closing its respective contacts. The register lamp associated with the energized relay is lighted to edge light the proper Lucite plate 63 that is in the sign window (a) of the B register 32.

Referring to FIG. 6, the contacts (0–3) of the stepping switch deck 111C are designated +, –, AC and ALG, respectively, and are connected to relays 167–170, respectively, which are all connected to a common voltage source not shown. The relays 167–169 open and close contacts 167A–169A, respectively, while the relay 170 controls contacts 170A and B. The contact arm 121 of the switch deck 111C steps across the contacts (0–3) in unison with the contact arm 121 of the switch deck 111A to apply ground thereto upon the closing of contact 241B by a relay 241. This in turn will energize one of the relays 167–170 depending upon the position of the contact arm 121 to close that relay's respective contacts.

Still referring to FIG. 6, the contacts (0–2) of the stepping switch deck 116C are each connected to a relay 174 which is connected to a voltage source not shown. The relay 174 controls contact 174A. When the contact 241B is closed, advancement of the contact arm 121 of the stepping switch deck 116C connects ground to the contacts (0–2) through the closed contact 241B as it steps over them in unison with the contact arm 121 of the switch deck 116A. This in turn energizes the relay 174 to close the contact 174A at each of the contact positions +, —, and AC, but not for the contact position ALG.

*Numeral and decimal point comparison circuit*

The hundreds and tens units comparison circuits and the decimal point comparison circuit for comparing the respective digits and decimal points in the B register 32 with the corresponding digit and decimal point in first the A register 34 and second the C register 35 are identical, and only one will be described. Referring to FIG. 7, a circuit for comparing the hundreds digit of the A and B register is shown.

The relays 74–83 are each connected to one of a series of the B register lamps 69B which are numbered 69B (0–9), respectively, and to ground. Each of the contacts (0–9) of the stepping switch deck 112B (FIG. 10) is connected to one of the A register lamps 69A which is correspondingly numbered (0–9) and to ground. One of the relays 84–83 is operated by the measuring device 24 to actuate one of the respective contacts 74A–83A, which will select one of a series of incremental voltage positions (0–9) along the length of a voltage divider 178 connected between the (—) 250-volt source 163 and ground. The contacts 74A–83A are connected to one of a pair of matched resistors 181A and B. Thus a voltage $E_1$, representative of a hundreds digit (0–9), is selectively taken from the voltage divider 178 and applied to the resistor 181A by actuating one of the relays 74–83. At the same time, the correspondingly numbered signal lamp 69B will be lighted to display that respective hundreds digit (0–9) in the window (b) of the B register 32.

A voltage divider 182, identical with the voltage divider 18, is divided into the same incremental voltage positions (0–9), each of which are connected to a correspondingly numbered contact (0–9) of the stepping switch deck 112C. The voltage divider 182 is connected between the +250-volt supply 162 and ground. The contact arm 121 of the switch deck 112C is connected to the resistors 181B. In this manner a voltage $E_2$, representative of a hundreds digit (0–9), is applied to the resistor 181B by stepping the contact arm 121 of the stepping switch deck 112C to a correspondingly numbered contact (0–9). At the same time the stepping switch deck 112B will select the correspondingly numbered signal lamp 69A to display the digit in the window (b) of the A register 34. Since the voltages $E_1$ and $E_2$ applied to each of the respective matched resistors 181A and B are opposite in polarity, a difference voltage $E_0$ will be produced at a junction point 184 only when the hundreds digit in the A and B registers differ.

The voltage $E_0$ is applied to a grid 187 of a vacuum tube 188 across a resistor 189 and to a grid 191 of a vacuum tube 192 across a resistor 193. The grid 187 is also connected to a bias voltage source 166 across a resistor 196. Each tube receives plate voltage from a voltage source 197 (FIG. 9). A relay 198, designated GREATER, and a load resistor 199 are connected in the plate circuit of the tube 188 while a relay 201, designated EQUAL, and a load resistor 202 are connected in the plate circuit of the tube 192. The relays 198 and 201 open and close contacts 198A and 201A, respectively. Cathodes 203 and 204 of the tubes 188 and 192 are connected to ground.

When the tubes 188 and 192 conduct, the relays 201 and 198 will be actuated to close their respective contacts 201A and 198A. The tubes 188 and 192 may be biased so that the relays will be actuated under the following critical voltage conditions.

| $E_0$ | Relays actuated |
|---|---|
| —14 v. or more negative | Neither. |
| 0 v. ±2 v. | Equal relay 201. |
| +14 v. or more positive | Greater relay 198 and equal relay 201. |

For example, assuming that the hundreds digit of the A register 34 is 5 and the hundreds digit for the B register 32 is 4, as shown in FIG. 1, the operation of the comparison circuit is as follows.

The contact arm 121 of the stepping switch 112C having stopped on contact 5 of the voltage divider 182 connects a voltage of $$E_2 = \text{approximately} + 140 \left( E_2 = \frac{+250 \text{ v.}}{9} \times 5 \right)$$

to the junction point 184.

The hundreds digit of the B register 32 being 4, relay 78 will be energized and close the contact 78A. This in turn connects a voltage $E_1$ of approximately —112 volts $$\left( E_1 = \frac{-250}{9} \times 4 \right)$$

to the point 184. As $E_1$ and $E_2$ are —112 volts and +140 volts, respectively, $E_0$ is equal to +14 volts and both the GREATER relay 198 and the EQUAL relay 201 will be operated. Had the hundreds digit of the A and B registers been equal, the voltages $E_1$ and $E_2$ would have been equal but opposite in polarity and $E_0$ would equal zero volts. This is a critical voltage condition and only the EQUAL relay 201 would be energized.

As stated, the hundreds digit comparison between the B and C registers is made in a circuit identical with FIG. 7 with the exception that the voltage $E_1$ is determined by closing one of a plurality of contacts 74B–83B (not shown) which are connected to a voltage divider similar to the voltage divider 178 and which are also controlled by the relays 74–83. The voltage $E_2$ is determined by the position of the contact arm 121 of the stepping switch deck 117C, the contacts (0–9) of which are likewise connected to a voltage divider identical with the voltage divider 182. The voltage dividers from which the voltages $E_1$ and $E_2$ are derived are connected to the voltage supplies 165 and 164 (FIG. 5) respectively. Thus the polarities of the voltages $E_1$ and $E_2$ are reversed for the B and C register comparisons. The voltage $E_0$ thus derived is used to control an amplifier to actuate either a GREATER relay 207 or an EQUAL relay 208, or both (shown only in FIG. 12), under the same voltage conditions before mentioned. The GREATER and EQUAL relays 207 and 208 respectively are arranged to open and close contacts 207A and 208A respectively.

The tens digit comparisons between first the A and the B registers, and second the B and C registers, are made in circuits identical to FIG. 7 and need not be further described. The tens digit comparison between the A and B registers results in the energization of a GREATER relay 209 or an EQUAL relay 211, or both, which in turn open or close contacts 209A and 211A. The relays and their contacts are shown only in FIG. 12 for simplicity. The tens digit comparison between the B and C registers results in the energization of a GREATER relay 212 or an EQUAL relay 213, or both, to open or close contacts 212A and 213A (shown only in FIG. 12).

As stated, the decimal point of the numerals displayed in the registers 32, 34, and 35 is permitted to float so that the range of the respective registers, using a hundreds, tens, and units digit, may be 0.01–99.9 when a decimal point is utilized. Each Lucite plate 63 mounted in the windows (b–d) of the A, B, and C registers has a decimal point engraved thereon and a register lamp 69 associated therewith.

Figure 12:
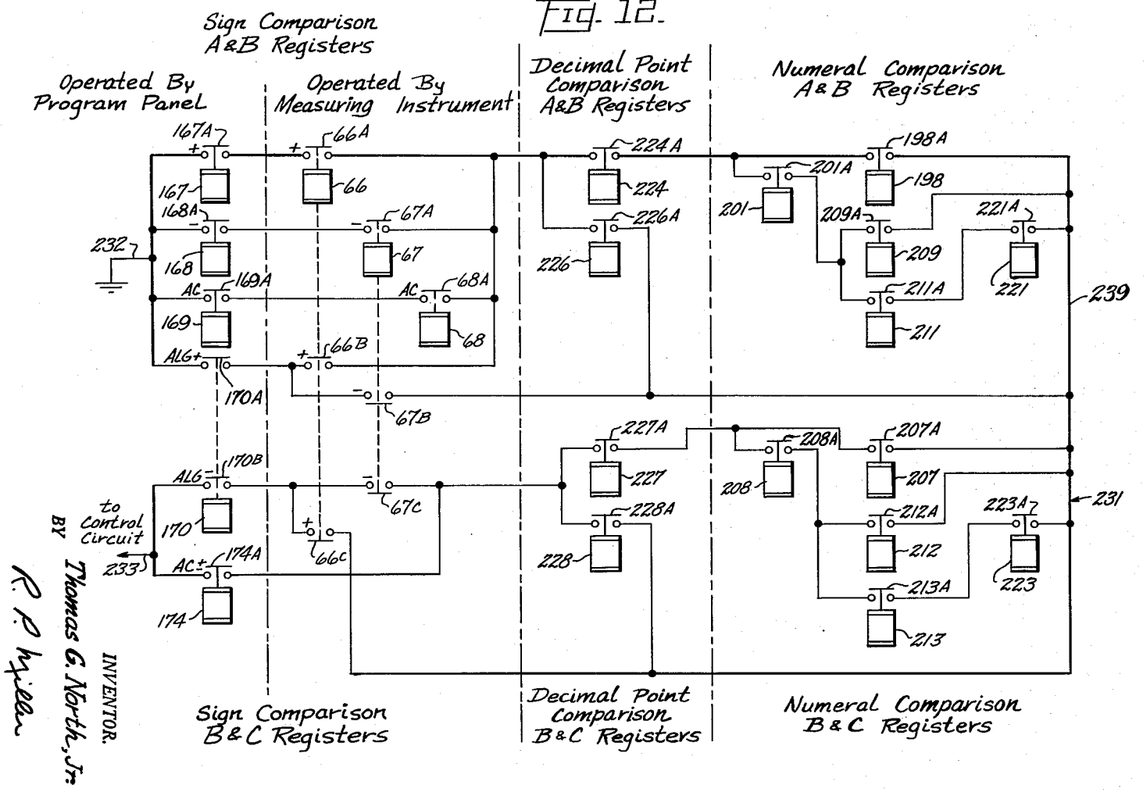
FIG. 12 is a diagrammatic view of a sign, numeral, and decimal point comparison logic circuit.

The decimal point comparison between first the A and B registers and second the B and C registers is made in circuits similar to FIG. 7. The decimal point comparison between the A and B registers results in the energization of a GREATER relay 226 or an EQUAL relay 224, or both, which, in turn, open or close contacts 226A and 224A, as shown in FIG. 12. The decimal point comparison between the B and C registers results in the energization of a GREATER relay 228 or an EQUAL relay 227, or both, to open or close contacts 228A and 227A, as shown in FIG. 12.

A portion of a units digit comparison circuit is shown in FIG. 8. The units digit comparisons are performed in the same fashion as the hundreds and tens digit comparisons, voltages $E_1$, $E_2$, and a resultant voltage $E_0$ being derived in a circuit identical to that shown in FIG. 7. As shown in FIG. 8, the resultant voltage $E_0$ is applied to a grid 214 of an amplifier tube 216 across a resistor 217. A bias resistor 218 connected to the voltage source 166 is connected to the control grid 214. A plate 219 of the tube is connected to the plate voltage source 197 through a GREATER relay 221 and a load resistor 222. The tube 216 is biased so as to conduct only when $E_0$ equals or exceeds the critical voltage of $+14$ volts. When the tube 216 conducts, the relay 221 is actuated to close its contact 221A.

The units digit comparisons between the B and C registers are made in the same manner in a similar circuit excepting the voltages $E_1$ and $E_2$ are of opposite polarity, the voltage dividers from which they are derived being connected to the voltage supplies 165 and 164, respectively. A GREATER relay 223, shown only in FIG. 12 for simplicity, is actuated to open and close contacts 223A.

*Logic-circuit*

The objects of the logic circuit, shown in FIG. 12, are: (1) to determine that the reading of the B register 32 is algebraically between the readings of the A register 34 and the C register 35, (2) determine that the same types of parameters are being compared, and (3) actuate a circuit to generate a Go signal upon a satisfactory comparison. Referring to FIG. 12, a sign, numeral, and decimal point comparison logic circuit is shown.

The logic circuit is divided into a top section, designated generally 239, for the A and B register comparisons, and a bottom section, designated 231, for the B and C register comparisons. Each section is further divided into a sign, decimal, and numeral portion. The circuit includes all of the relay contacts previously discussed in conjunction with the sign, decimal, and numeral comparison circuits. As shown, all of the contacts are connected between a ground 232 at the one end and an output 233 at the other. The output 233 is connected to a control circuit shown in FIG. 9. The logic circuit is arranged so as to connect the ground 232 to the control circuit (FIG. 9) to cause it to generate a Go signal only when circuit continuity is established between the ground 232 and the output 233. This condition is obtained by closing the proper combination of relay contacts. The logic circuit can best be understood by a description of how a comparison proceeds.

Referring to FIGS. 5, 6, 7, 8, 10, 11, and 12, consider the following comparison test:

EXAMPLE 1

A register ____________________________ +6.00
B register ____________________________ +4.00
C register ____________________________ +2.00

Starting first with a sign comparison between the A and B registers, the relays 167 (FIGS. 6 and 12) and 66 (FIGS. 5 and 11) will be energized to close the contacts 167A and 66A, respectively. For the sign comparison between the B and C registers, the relay 174 will be actuated to close the contact 174A which overrides the open contacts 170B and 67C to establish continuity within the sign comparison portion of the logic circuit. If the signs being compared were minus signs in the A, B, and C registers, contacts 168A and 67A would have been closed as a result of the A–B sign comparison, and the contact 174A would again be closed in the B–C register sign comparison to establish continuity through the sign comparison section of the logic circuit. Thus in sign comparisons of this type, +, −, AC, etc., the contacts 167A–169A are in series with the contacts 66A–68A, respectively, and verify that the signs being compared are alike. It is to be noted that the contact 174A will be closed for all comparisons except an algebraic comparison.

When a sign comparison, designated algebraic, is to be made, contacts 170A and B are both closed and either contacts 66B and C or contacts 67B and C are closed depending upon whether the sign of the numeral in the B register 32 is plus or minus. For example, by changing the signs of the numerals in the example shown, and by arranging the programming for an algebraic comparison, the following operation will occur:

EXAMPLE 2

A register ____________________________ +6.00
B register ____________________________ +4.00
C register ____________________________ −2.00

Contacts 170A and B will close as will contacts 66B and C to complete the circuit continuity through the sign comparison portion of the logic circuit. It is to be noted that closing of the contacts 66C overrides the B and C register decimal and numeral comparison portions of the logic circuit. This is correct from a logical and mathematical standpoint since a positive number on the B register 32 is greater than any negative number on the C register 35.

Another example of an algebraic comparison is as follows:

EXAMPLE 3

A register ____________________________ +6.00
B register ____________________________ −4.00
C register ____________________________ −2.00

In this comparison contacts 170A and B will be closed as well as contacts 67B and C to complete the necessary continuity through the sign comparison portion of the logic circuit. It is to be noted that the closing of the contacts 67B overrides the A and B register comparison circuits while the full comparison of the decimal point and numerals is made between the B and C registers.

Referring again to Example 1, having established continuity through the sign comparison portion of the logic circuit, the description of a decimal point comparison may next be considered. In accordance with the operation described in conjunction with FIG. 7 (and referring to FIG. 12), it is seen that in the A and B register decimal point comparison the EQUAL relay 224 will be energized to close the contact 224A since the decimal point in both the A and B registers is in the A decimal point position. Had the decimal point in the A register been in the A decimal point position and the decimal point in the B register been in the B decimal point position, neither contact 224A or 226A would have closed. This would result in a No-Go signal. Had the decimal point in the B register 32 been in the A decimal point position and the decimal point in the A register 34 in the B decimal point position, the GREATER relay 226 would have been energized and the contact 226A would have been closed. Thus the numeral comparison circuits for the A and B registers would be overridden and continuity would have been completed through that portion of the logic circuit. This result follows since in this instance the number in the A register 34 is necessarily greater than the number in the B register 32.

The decimal point comparison between the B and C registers is the same as that just described except that in the comparison circuit, shown in FIG. 7, the voltages $E_1$ and $E_2$ are reversed in polarity, the voltage $E_1$ being positive (+) and the voltage $E_2$ being negative (—). Thus when the voltages $E_1$ and $E_2$ are equal, the EQUAL relay 227 will be energized to close contact 227A. If $E_1$ is greater than $E_2$, the contact 228A will be closed by the GREATER relay 228. Closing of the contact 228A overrides the B and C register numeral comparison circuits since the number in the B register 32 would of necessity be greater than the number in the C register 35. Had the voltage $E_2$ been greater than $E_1$, neither of the contacts 227A or 228A would have closed, and the comparison would be discontinued. Thus by the closing of the contact 224A and either of the contacts 227A or 228A, continuity is established through the decimal portion of the logic circuit. It may also be completed by closing the contacts 226A and 227A.

The logic circuit (FIG. 12) completes the numeral comparisons starting first with the most significant figure, in this case the hundreds digit. The hundreds digit comparison between the A and B registers is performed in the circuit shown in FIG. 7. A sample numeral comparison will be considered, referring again to Example 1.

Referring again to the description of the operation of FIG. 7, it follows that in this case the hundreds digit (6) of the A register is greater than the hundreds digit (4) of the B register, and consequently the GREATER relay 198 will be energized to close the contact 198A. As shown in FIG. 12, the closing of these contacts will override the tens and units comparison circuits and establish the necessary continuity in the numeral comparison portion of the logic circuit for the comparison between registers A and B.

The hundreds digit comparison between the B and C registers is the same as that just described in conjunction with FIG. 7 except the voltages $E_1$ and $E_2$ are opposite in polarity, the voltage dividers from which they are derived being connected to the voltage supplies 165 and 164, respectively. In this instance the hundreds digit (4) in the B register is greater than the hundreds digit (2) of the C register, and the contact 207A will be closed to complete the necessary circuit continuity. Closing of the contact 207A overrides the tens and units comparison circuits for the B and C register comparisons. Since the numeral 4 is greater than the numeral 2, no further comparison is needed between the B and C registers.

Had the numerals to be compared been as follows, the comparison would be performed in this manner, assuming the sign and decimal comparison have been completed:

EXAMPLE 4

A register ______________________________ +42.4
B register ______________________________ +42.2
C register ______________________________ +42.0

As the hundreds digits on the A and B registers are the same (4), the EQUAL relay 201 (FIG. 7) will be operated to close the contact 201A, while the contact 208A will be closed as a result of the hundreds digit comparisons between the B and C registers. It is then necessary for the logic circuit to consider the tens digit of the respective numerals.

As the tens digits of the A, B, and C registers are equal, all being 2, the contacts 211A and 213A will close. It is then necessary to compare the units digits of the A, B, and C registers to establish the necessary continuity. It is to be noted that had the tens digit of the A register been greater than that of the B register, the contact 209A would have closed to override the A and B register units digit comparison circuit. Had the tens digit of the B register been larger that of the C register, the contact 212A would have closed to override the B and C units digit comparison circuit.

The units comparison between the A and B registers is performed by the circuit shown in FIG. 8. In this case, a 4 being greater than a 2, the relay 221 is energized to close the contact 221A and thus complete circuit continuity for the A and B register comparison. It is to be noted that no EQUAL relay is provided for the units digit comparison circuit. This is because the units digit is the most insignificant figure and a certain degree of tolerance is desirable. Thus, where the unit digits are equal, the circuit continuity will not be established. However, the units circuit can be made like the hundreds circuit so that continuity will be established when the digits are equal if no tolerance is desired.

The units digit comparison between the B and C registers is performed in a circuit similar to that shown in FIG. 8 except the voltages $E_1$ and $E_2$ are reversed in polarity, the voltage $E_1$ being positive (+) and the voltage $E_2$ being negative (—). In this instance the 2 being greater than 0, the contact 223A will be closed to establish circuit continuity. Had the units digits of the B and C registers been equal, no circuit continuity would have been established.

The sample comparisons (Examples 1 and 4) have been non-algebraic; that is, the results of the comparisons were not dependent upon the sign of the numerals compared other than for purposes of vertification. The following example demonstrates the operation of and algebraic (ALG) comparison:

EXAMPLE 5

A register ______________________________ +7.00
B register ______________________________ —2.00
C register ______________________________ —7.00

Having arranged the program panel 23 to set up the A and C registers for an algebraic (ALG) comparison, the contacts 170A and B will be closed. The measuring device will actuate the relay 67 to close the contact 67B and 67C whereby the decimal and numeral comparison circuits between the A and B registers will be overriden by the sign comparison circuit. This decimal point and numeral comparisons are overriden because a plus quantity is always greater than a minus quantity. Continuity is completed through closed contacts 170B and 67C for the sign comparison between registers B and C.

In the numeral comparison between the B and C registers the contact 207A will close. This is so because the terminal strip 148 associated with the stepping switch deck 128 was programmed to operate the relay 149 during this algebraic comparison. Operation of the relay 149 will reverse the normal —, + voltage applied to the conductors 164 and 165, respectively, which are connected to the B and C comparison circuits. The voltages $E_1$ and $E_2$ will thereby be reversed so that upon comparison the voltage $E_2$ will be greater than $E_1$ whereby the relay contact 207A will be closed to establish continuity through the numeral comparison circuit.

Had such a reversal of voltage not been programmed, the voltage $E_2$ would have been less than $E_1$ and neither the contact 207A nor the contact 208A would have closed. Therefore, the necessary circuit through the numeral comparison circuit would not have been completed and a No-Go signal would have been produced in the control circuit 140.

The decimal point comparison between the B and C registers is then made in the manner above referred to in the description of Example No. 1. The equal relay 227 will be actuated to close the contact 227A whereby continuity will be established through the B and C register decimal point comparison circuit. A circuit will then be completed from the line 233 to ground 232 through the following contacts: 170B, 67C, 227A, 207A, 67B, and 170A. The line 233 will then apply ground to a relay of the control circuit.

It will be apparent from the preceding description, that any desired degree of accuracy can be obtained by the use of additional circuitry. This may be done for example by the addition of a thousandths digit in the programming panel and further adding related apparatus for operatively connecting that digit to the other circuits in the manner shown above.

Control circuit

The control circuit, as shown in FIG. 9, serves to control the sequence and timing of operations in the comparison panel, to transmit the Go signal to the programming panel 23, to determine the operating mode, either manual or automatic, and to provide a device for the manual positioning of the master position controller 127 in the programming panel 23. In addition, the control circuit controls the voltages for the stepping switches, relays, and comparison circuits and provides the Go or No-Go indication.

The control circuit comprises a plurality of relays 234-244 which are energized from a 24 v. voltage source connected to a conductor 248. The relays 234-236, 238, 240, 242, 243, and 244 open and close contacts 234A-236A, 238A, 240A, 242A, 243A, and 244A, respectively. The relays 237, 239, and 241 open and close contacts 237A and B, 239A and B, and 241A and B, respectively.

The relays 241, 242, 244, and 239 may be of the quick-acting and releasing type. The relays 240 and 243, may be of the time-delay type wherein there is a delay before closing and a quick release. The relays 235, 236, and 238 may be of the slow-acting type wherein there is a delay before closing and a delay prior to opening. The relays 234 and 237 close quickly and release or open slowly.

The relay 244 is connected to a −250 v. source 163 through a contact of a switch 249A. In its closed position, the contact 249A causes the relay to be energized to close a contact 244A. In this closed position the contact 249A connects the voltage source 163 to the voltage supply conductor 166. Closure of the contacts 244A connects a +250 v. source 162 to the voltage supply conductor 160. It is to be noted that the contact 244A will be opened to disconnect the +250 v. source 162 from the conductor 160 when the −250 v. source 163 fails. This provides a safety circuit and removes the +250 v. plate supply from all tubes in the comparison circuits when the source 163 fails. By removing the +250 v. plate supply from the tubes, none of the relay contacts in the logic circuit will be closed. The switch 249 is a single-throw switch having three poles, 249A, B, and C, movable between automatic and manual positions.

The remainder of the circuit will now be described. Assume initially that continuity has been established in the logic circuit whereby the ground 232 is connected to the relay 237 through the conductor 233 and that the switch 249 is in the Auto position. At this time and before the relay 237 is actuated, the contact of the relays 234-244, respectively, are in the following state:

CHART I

| Contacts: | State |
|---|---|
| 238A | Open. |
| 236A | Do. |
| 235A | Closed. |
| 242A | Do. |
| 241A | Do. |
| 241B | Do. |
| 243A | Do. |
| 240A | Do. |
| 239A | Do. |
| 239B | Do. |
| 234A | Do. |
| 244A | Do. |
| 237A | Do. |
| 237B | Open. |

With the ground 232 connected to the relay 237, a circuit will immediately be completed therethrough to open the normally closed contact 237A and close the normally open contact 237B. Prior to the respective opening and closing of the contacts 237A and B, the relay 238 had been energized by a circuit completed through the contact 239A which was originally closed according to the initial condition chart above. The relay 238, being slow-acting, delays closing its contact 238A until after operation of the contacts of the relay 237. Closure of the contact 238A completes a circuit from ground through the contact 237B, through a parallel connection of a Go lamp 253 and the relay 236.

Energization of the relay 236 closes a contact 236A after a time delay, after which time delay the relay 235 will be energized. After a time delay, the slow-acting relay 235 will open the contact 235A, which removes the −24 v. potential from the relay 234 and the conductor 260. Prior to the opening of the contact 235A, the conductor 260 had connected the −24 v. potential to other parts of the control circuit which function, among other things, to hold the relay 238 in an energized condition whereby the contact 238A will be closed for keeping the Go lamp 253 lit. Thus, the combined time delays of the relays 235 and 236 provide a period of time during which the Go lamp 253 may be observed prior to the opening of the contact 235A and its resultant deenergization of the relay 238.

Removal of the −24 v. potential from the conductor 260 (by the opening of the contact 235A), deenergizes the relays 241 and 242, which immediately open their respective contacts 241A, 241B, and 242A. Opening the contact 241B removes ground from the relays 66-68, 74-83, 85-94, 96-105, and 107-109, associated with the B register. Opening the contact 242A removes the −24 v. potential from the step coils 122 of the stepping switches 111-120 to prevent excessive arcing at the programming decks 128-139. Removal of voltage from the coils of relays 240 and 243 causes the contacts 240A and 243A to open. Opening of the contacts 240A and 241A opens the circuit from the conductor 248 through the coil of relay 239 to deenergize the latter. The contacts 239A and 239B are thereby opened to respectively deenergize the relay 238 and remove the +250 v. plate supply potential from the conductor 197. The relays in the comparison circuits are deenergized by the removal of voltage from the conductor 197 whereby the logic circuit opens and removes ground from the relay 237. Deenergization of the relays 237 and 238 will open the respective contacts associated therewith, the relay 238 opening its contact 238A before the contacts 237A and 237B are opened because of the difference in release delay times of the two relays. Because of this delay time difference, the power for the Go and No-Go lamps will be removed before the contact 237A closes and the contact 237B opens. In this manner the No-Go lamp 254 cannot light even though the contact 237A is closed.

The relay 234 having been deenergized by the opening of the contact 235A, delays the release of the contact 234A until after the contacts of the relays 240, 242, and 243 open, whereby the coil 144 will be deenergized. The open contact 234A represents a Go signal which causes the arm 141 to advance one step to change the program for the next test.

The opening of the contact 238A removed ground from the relay 236, which, after a time delay, opens the contact 236A. The open contact 236A removes ground from the relay 235, which after a longer time delay closes the contact 235A. These time delays of the relays 236 and 235 combine to delay closure of the contact 235A until after the relay 234 has opened the contact 234A. Closure of the contact 235A energizes the relay 234, which immediately closes the contact 234A whereby the coil 144 will be energized, the contact 144A opened, and the contact arm 141 cocked.

Closure of the contact 235A further energizes the relay 243, which, after a time delay of sufficient duration to permit the programming decks 127-139 to step to the new program position or to the initial starting position, closes the contact 243A. The closed contact 243A applies −24 v. to the relay 242 which immediately closes the contact 242A to connect the conductor 248 to the step coils 122 for causing the stepping switches 111–120, associated with those coils, to step to their new programmed positions.

During the stepping of the step switches 111–120, the test panel 25 will program a new test input for the test unit 26. The test unit will emit a new test signal to be measured by the measuring instrument 24. During the time that the measuring instrument 24 requires to make a measurement, the instrument is in a state of transition and is said to be unbalanced. While the instrument is so unbalanced, a comparison must not be made. Therefore, a relay (not shown) may be provided for opening a contact 256 during this unbalanced condition. The open contact 256 will prevent the −24 v. potential of the conductor 260 from being applied to the coil of relay 241 and therefore the ground 140 will not energize the B register relays through the open contact 241B of relay 241. Closure of the contact 256 at the end of the unbalance condition energizes the relay 241, which immediately closes the contacts 241A and 241B. Closure of contact 241A conditions a circuit that may be tracted from the conductor through the now closed contact 241B, through the open contact 240A, and through the relay 239 to ground. The relay 240 having a long closure-time delay, will close the contact 240A after the stepping switches 111–120 have stopped at their new programmed positions. Closure of the contact 240A will complete the last-mentioned conditioned circuit to energize the relay 239, which will close the contacts 239A and 239B to apply the +250 v. plate voltage 197 to the comparison circuit and energize the relay 238. The condition of the relays and contacts of the control circuit 140 is now in accordance with the chart above and the control circuit is prepared to have ground connected to the relay 237 by the logic circuit.

If the logic circuit fails to connect ground to the relay 237, closure of the contact 238A will complete a circuit from the conductor 248 through the No-Go lamp 254, through the closed contact 237A, through the contact 238A to ground, thereby lighting the No-Go lamp. The operator is thereby apprised that the comparison was not successful, whereupon the operator may determine which comparison has failed by reference to the lighted indicating lamp 51.

Manual operation of the testing device is performed by through the switch 249 (FIG. 9) to the position designated "MAN," and opening and closing the pushbutton switch 257. This action will open and close the contacts 234A to pulse the coil 144, permitting the contact arm 141 of the master controller 127 to make one step at a time according to the program strapped in the terminal strip 148 associated therewith. In the manual mode, readings for each test can be visually observed in all three registers but no comparisons are made since relays 244, 241, and 240 have been disabled by open contacts 249A, 249B, and 249C, respectively, of switch 249.

Referring again to FIG. 9, the procedure for starting automatic testing will be described. With the mode switch 249 in the automatic position, the contacts of the relays 234–244 in the positions shown in Chart I, and the contact arm 141 of the master deck 127 in the zero (0) position, the operator presses the switch 257. This removes the −24 v. potential from the relay 234 which releases the contact 234A. Release of the contact 234A removes the −24 v. potential from the stepping switch coil 144 which releases the contact 144A and steps the arm 141 to position 1. Thereafter, the contact arm 141 will be controlled automatically by the control circuit.

It will be understood that the above-described arrangement of circuits and apparatus together with the construction of elemental parts are simply illustrative of an application of the principles of the invention, and many other modifications may be made without departing from the invention.

What is claimed is:
1. A comparison device which comprises:
   a test panel for producing a succession of test signals representative of a variable characteristic;
   a measuring instrument for receiving and converting each of the test signals into a series of voltages, each voltage representing a digit in a test number equivalent to the magnitude of the variable characteristic measured;
   a register for receiving the voltages representing the digits of the test number and visually displaying the test number;
   a programming panel for producing in succession pairs of upper and lower limit signals, each limit signal comprising a series of voltages, each voltage representative of the magnitude of a digit of the upper and lower limit numbers;
   a register for receiving the voltages of the upper limit number and visually displaying the upper limit number;
   a register for receiving the voltages of the lower limit number and visually displaying the lower limit number;
   electronic means for receiving and comparing the magnitudes of the voltages representing each digit of the test number with the magnitudes of the voltages representing the corresponding digit firstly of the upper limit number and secondly of the lower limit number, said electronic means producing output signals representing the relative magnitudes of corresponding test number digits and limit number digits;
   a plurality of relays each selectively energized in response to an output signal from said electronic means;
   a logic circuit having a first set of normally open contacts series-connected to a second set of normally open contacts, said first and second sets of contacts controlled by the relays, said first set of contacts being closed when certain of said relays are energized by the output signals of said electronic means representing that the upper limit number exceeds the test number, said second set of contacts being closed when certain other of said relays are energized by the output signals of said electronic means representing that the test number exceeds the lower limit number; and
   means responsive to the closure of said first and second sets of contacts for initiating another comparison.

2. A comparison device for determining in succession when each of a series of test numbers is between predetermined upper and lower limit numbers wherein each of the test and limit numbers has a sign and at least one significant digit, said device comprising:
   first means for producing signals representative of the sign and each digit of the test and limit numbers to be compared;
   electronic means for comparing the signals representing the digits of the test number with the signals representing the corresponding digits of first the upper limit number and second the lower limit number, said electronic means producing outputs representative of the relationship between the compared digit signals;
   a logic circuit including a first normally open circuit in series with a first parallel combination of normally open second and third circuits, a fourth normally open circuit in parallel with said first circuit and said first parallel combination of said second and third circuits, a second parallel combination of normally open fifth and sixth circuits series-connected to a terminal that is common to said fourth circuit and said first parallel combination;

means responsive to said first means producing signals representing that the signs of the upper limit number and the test number are plus and minus respectively for closing the fourth circuit to override the first circuit and the parallel combination of the second and third circuits;

means responsive to said first means producing signals representing that the sign of the upper limit number is the same as the sign of the test number for closing the first circuit;

means responsive to the output of said electronic means representing that the most significant digit of the upper limit number exceeds the corresponding digit of the test number for closing the second circuit to override the third circuit;

means responsive to the output of said electronic means representing that one of the less significant digits of the upper limit number exceeds the corresponding digit of the test number for closing the third circuit;

means responsive to said first means producing signals representing that the signs of the lower limit number and the test number are minus and plus respectively for closing the fifth circuit to override the sixth circuit to complete an electrical path through the logic circuit;

means responsive to (1) the first means producing signals representing that the sign of the test number is the same as the sign of the lower limit number and (2) the output of said electronic means representing that one of the digits of the test number exceeds a corresponding digit of the lower limit number for closing the sixth circuit to complete an electrical path through the logic circuit; and means responsive to completion of an electrical path through the logic circuit for actuating the first means to produce signals representative of the next successive test number and limit numbers.

References Cited by the Examiner

UNITED STATES PATENTS

| | | |
|---|---|---|
| 2,865,567 | 12/1958 | Booth et al. |
| 2,884,616 | 4/1959 | Fillebrown et al. ___ 340—146.2 |
| 2,970,260 | 1/1961 | Flint _______________ 324—73 |
| 2,977,535 | 3/1961 | O'Connor et al. ______ 324—73 |
| 2,996,249 | 8/1961 | Wang ___________ 340—146.2 |
| 3,011,151 | 11/1961 | Ketchledge ________ 340—146.2 |
| 3,021,514 | 2/1963 | Regis et al. |
| 3,090,942 | 5/1963 | Gruenz ___________ 340—146.2 |

WALTER L. CARLSON, *Primary Examiner.*

LLOYD McCOLLUM, *Examiner.*

G. S. KINDNESS, E. L. STOLARUN,
*Assistant Examiners.*